US011068543B2

(12) United States Patent
Gupta et al.

(10) Patent No.: US 11,068,543 B2
(45) Date of Patent: Jul. 20, 2021

(54) COMPONENT AND OBJECT MANAGEMENT OF INFORMATION HANDLING SYSTEMS

(71) Applicant: Dell Products L.P., Round Rock, TX (US)

(72) Inventors: Chitrak Gupta, Bangalore (IN); Chandrasekhar Puthillathe, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 16/437,466

(22) Filed: Jun. 11, 2019

(65) Prior Publication Data
US 2020/0394219 A1 Dec. 17, 2020

(51) Int. Cl.
*G06F 16/906* (2019.01)
*G06F 40/205* (2020.01)
*G06Q 10/08* (2012.01)
*G06F 16/9035* (2019.01)
*G06F 16/908* (2019.01)

(52) U.S. Cl.
CPC .......... *G06F 16/906* (2019.01); *G06F 16/908* (2019.01); *G06F 16/9035* (2019.01); *G06F 40/205* (2020.01); *G06Q 10/087* (2013.01)

(58) Field of Classification Search
CPC .. G06F 16/906; G06F 40/205; G06F 16/9035; G06F 16/908; G06Q 10/087
USPC ....................................................... 707/755
See application file for complete search history.

(56) References Cited

U.S. PATENT DOCUMENTS

| 5,805,796 | A | * | 9/1998 | Finch | G06F 11/00 710/17 |
| 5,968,138 | A | * | 10/1999 | Clough | G06F 3/1203 710/8 |
| 5,991,826 | A | * | 11/1999 | McGee | G06F 9/4411 710/10 |
| 7,197,489 | B1 | * | 3/2007 | Gauvin | H04L 41/0233 |
| 7,289,997 | B1 | * | 10/2007 | Kita | G06F 16/289 |
| 7,613,726 | B1 | * | 11/2009 | Spivak | G06F 16/9535 |

(Continued)

OTHER PUBLICATIONS

Pego et al., "Automatic Discovery and Classifications of IoT Devices," 2017 12th Iberian Conference on Information Systems and Technologies (CISTI), Lisbon, 2017, pp. 1-10, doi:10.23919/CISTI.2017.7975691. (Year: 2017).*

(Continued)

*Primary Examiner* — Phuong Thao Cao
(74) *Attorney, Agent, or Firm* — Baker Botts L.L.P.

(57) ABSTRACT

Methods, systems, and computer programs encoded on computer storage medium, for performing an inventory of devices to identify a particular device; creating a data structure for the particular device including data identifying the particular device; providing, a request including the data structure for the particular device; parsing the request and determining that a device class for the particular device is a new device class; in response to determining that the device class for the particular device is a new device class, creating a device-specific class for the particular device and a metaobject format for the particular device; providing the created device-specific class and the metaobject format for the particular device; and creating an instance of the device-specific class for the particular device.

17 Claims, 3 Drawing Sheets

(56) References Cited

U.S. PATENT DOCUMENTS

| | | | | |
|---|---|---|---|---|
| 7,996,368 B1* | 8/2011 | Nalder | G06F 13/102 | 707/673 |
| 8,225,310 B1* | 7/2012 | Robertson | G06F 9/44521 | 717/177 |
| 8,244,778 B1* | 8/2012 | Wei | G06F 16/214 | 707/803 |
| 8,347,219 B1* | 1/2013 | Joyce | G06F 9/451 | 715/762 |
| 8,359,245 B1* | 1/2013 | Ballaro | G06Q 30/0635 | 705/27.1 |
| 8,516,504 B1* | 8/2013 | Park | G06F 8/24 | 719/328 |
| 9,124,934 B2* | 9/2015 | Tripathi | H04N 21/25825 | |
| 9,141,564 B1* | 9/2015 | Wieland | G06F 9/44505 | |
| 9,772,828 B2* | 9/2017 | Goetz | G06F 8/41 | |
| 9,846,577 B1* | 12/2017 | Riedl | G06F 3/0484 | |
| 2002/0062287 A1* | 5/2002 | Katz | G06Q 30/0603 | 705/51 |
| 2002/0065950 A1* | 5/2002 | Katz | H04N 21/2543 | 719/318 |
| 2002/0133581 A1* | 9/2002 | Schwartz | H04L 41/0226 | 709/223 |
| 2002/0169845 A1* | 11/2002 | Szucs | H04L 12/2805 | 709/208 |
| 2003/0093769 A1* | 5/2003 | Kumar | G06F 8/30 | 717/108 |
| 2004/0044755 A1* | 3/2004 | Chipman | H04L 29/06 | 709/223 |
| 2005/0171953 A1* | 8/2005 | Bonilla | H04L 41/0226 | |
| 2007/0077665 A1* | 4/2007 | Bump | G06F 3/0484 | 438/14 |
| 2007/0079250 A1* | 4/2007 | Bump | G05B 23/0216 | 715/762 |
| 2008/0208897 A1* | 8/2008 | Lew | G06F 16/2255 | |
| 2009/0316602 A1* | 12/2009 | Nandy | H04L 45/02 | 370/254 |
| 2010/0260066 A1* | 10/2010 | August | H04L 41/5058 | 370/254 |
| 2011/0088027 A1* | 4/2011 | Jelvis | G06F 9/4411 | 717/174 |
| 2012/0246305 A1* | 9/2012 | Vedula | H04L 41/0233 | 709/224 |
| 2015/0173843 A1* | 6/2015 | Maughan | A61B 90/90 | 705/3 |
| 2015/0236899 A1* | 8/2015 | Sengupta | H04L 41/0879 | 715/736 |
| 2017/0344217 A1* | 11/2017 | Gnech | G06F 3/04842 |
| 2018/0088639 A1* | 3/2018 | Remis | G06F 9/44505 |
| 2018/0219973 A1* | 8/2018 | Chae | H04L 67/34 |
| 2019/0050187 A1* | 2/2019 | Nakazawa | G06F 3/1203 |
| 2019/0178643 A1* | 6/2019 | Metzler | G01C 15/002 |
| 2019/0236271 A1* | 8/2019 | Shivanna | H04L 9/3247 |
| 2019/0391546 A1* | 12/2019 | Jundt | G05B 19/0426 |
| 2020/0081698 A1* | 3/2020 | Mansukhani | G06F 8/60 |

OTHER PUBLICATIONS

Emulex, CIM Provider Package, Version 10.4, Installation Guide, 2015; 15 pages.

* cited by examiner

COMPONENT AND OBJECT MANAGEMENT OF INFORMATION HANDLING SYSTEMS

BACKGROUND

Field of the Disclosure

The disclosure relates generally to information handling systems, and in particular, component and object management of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conventional systems, a remote access controller can provide the infrastructure to inventory, monitor, and configure different device classes on a server computing system. The design can be based on prior knowledge of devices and it's supported attributes such that internal instrumentation objects and interface access resources are defined accurately. However, there are no methods to support unknown devices from a manageability perspective.

SUMMARY

Innovative aspects of the subject matter described in this specification may be embodied in a method including performing, by an inventory computing module, an inventory of devices to identify a particular device; creating, by the inventory computing module, a data structure for the particular device including data identifying the particular device; providing, by the inventory computing module and to a computing manager module, a request including the data structure for the particular device; parsing, by the computing manager module, the request and determining that a device class for the particular device is a new device class; in response to determining that the device class for the particular device is a new device class, creating, by the inventory computing module, a device-specific class for the particular device and a metaobject format for the particular device; providing, by the inventory computing module and to the computing manager module, the created device-specific class and the metaobject format for the particular device; and creating, by the computing manager module, an instance of the device-specific class for the particular device.

Other embodiments of these aspects include corresponding systems and apparatus.

These and other embodiments may each optionally include one or more of the following features. For instance, the data structure is a common manageability programming interface (CMPI) data structure. Parsing, by the computing manager module, the request and determining that the device class for the particular device is stored by a database; and creating, by the computing manager module, an instance of the device class for the particular device. Configuring the particular device, including invoking a method that is supported at the particular device. Identifying a change event of a database field for a database object of the device-specific class, and creating an associated indication instance. Creating the device-specific class includes creating the device-specific class in an application specific namespace. Class definitions of the device-specific class include i) a list of device properties, ii) metadata for properties, iii) list of supported intrinsic methods, and iv) list of extrinsic methods and parameters.

Particular embodiments of the subject matter described in this specification may be implemented so as to realize one or more of the following advantages. For instance, an introspectable and dynamic method to create objects which are not managed by known schema is provided; dynamic namespace creation for appropriate data encapsulation for specific inventory sources; creating a dynamic device hierarchy based on device characteristics; binding action libraries in accordance to extrinsic method definitions; and an event-based infrastructure and generation event on database value create/update.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
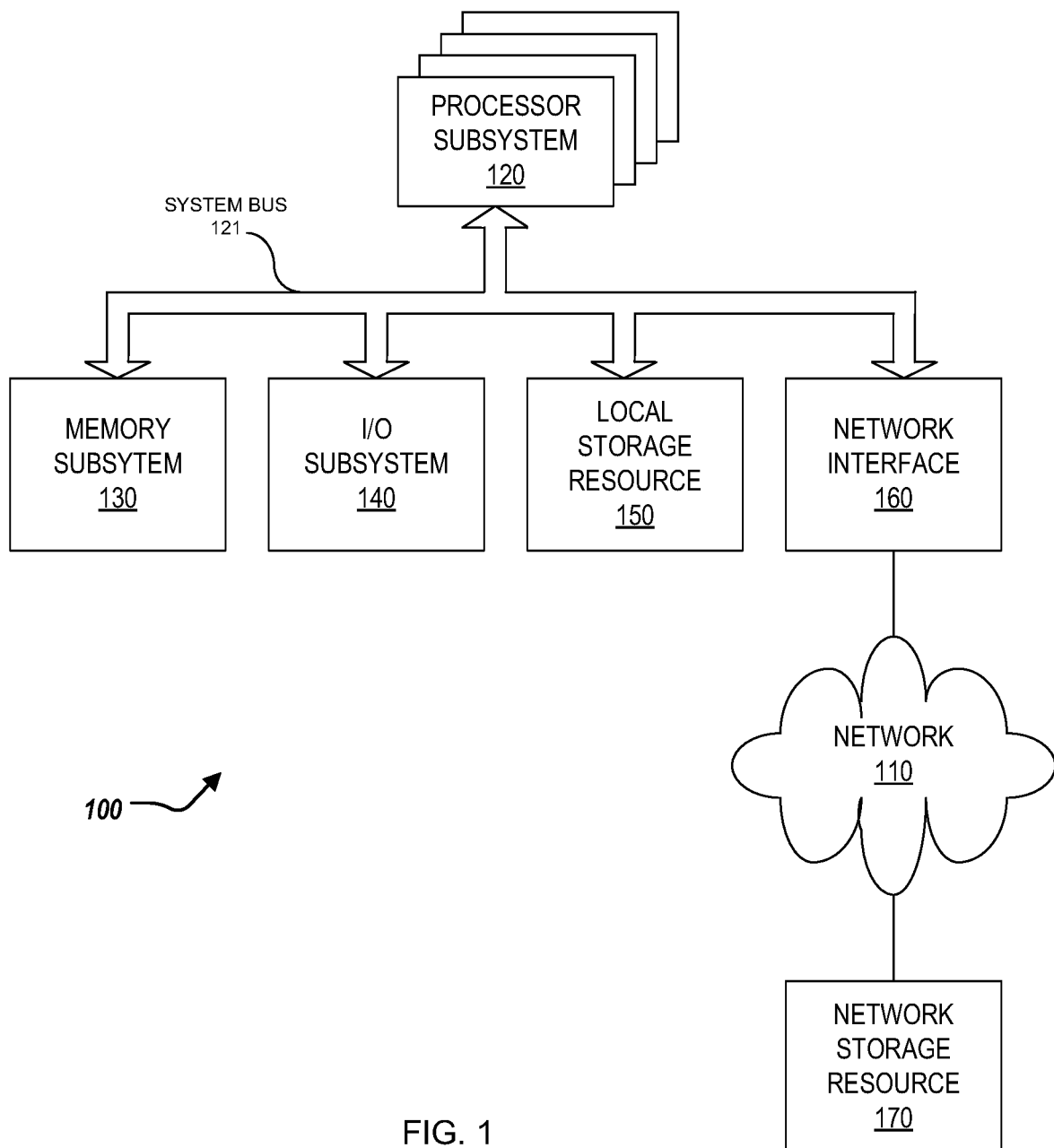
FIG. 1 is a block diagram of selected elements of an embodiment of an information handling system.

This document describes a method and a system to provide a dynamic entity modeling by the usage of introspectable CMPI object management. Specifically, this document describes performing, by an inventory computing module, an inventory of devices to identify a particular device; creating, by the inventory computing module, a data structure for the particular device including data identifying the particular device; providing, by the inventory computing module and to a computing manager module, a request including the data structure for the particular device; parsing, by the computing manager module, the request and determining that a device class for the particular device is a new device class; in response to determining that the device class for the particular device is a new device class, creating, by the inventory computing module, a device-specific class for the particular device and a metaobject format for the particular device; providing, by the inventory computing module and to the computing manager module, the created device-specific class and the metaobject format for the particular device; and creating, by the computing manager module, an instance of the device-specific class for the particular device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
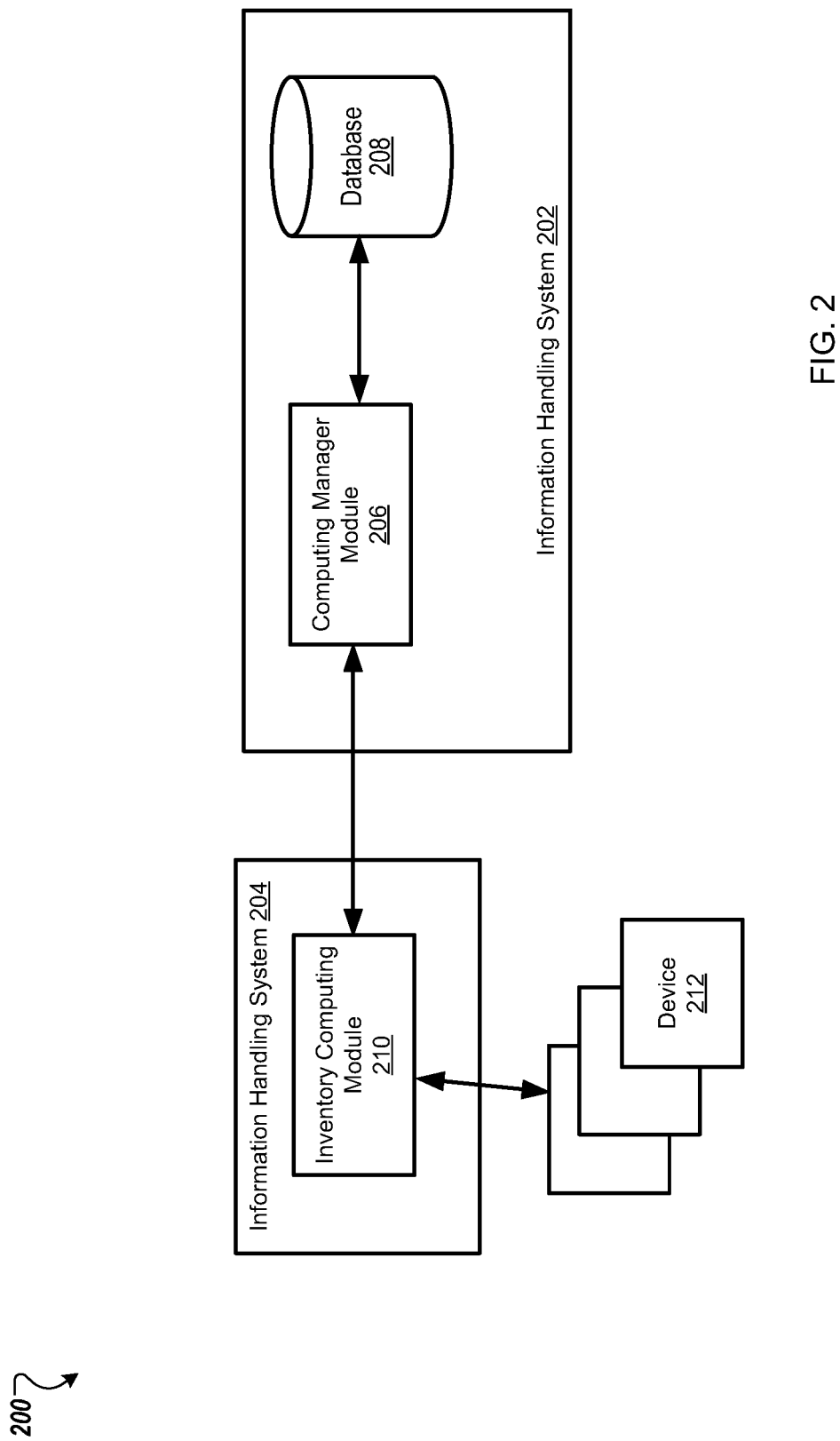
FIG. 2 is a block diagram of a computing environment for component and object management.
Figure 3:
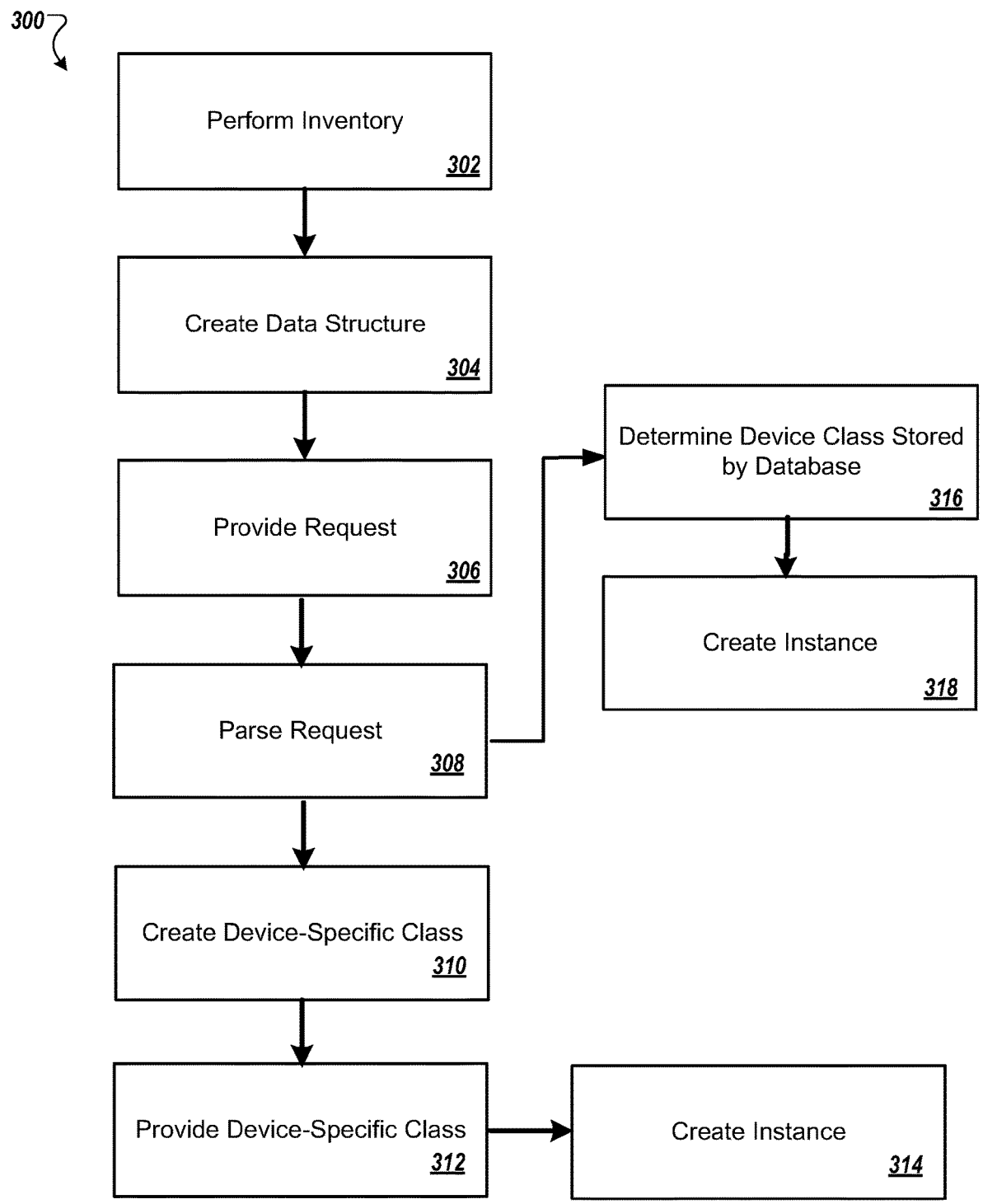
FIG. 3 is a flowchart of a method for component and object management.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 illustrates a computing environment 200 for component and object management. The environment 200 can include information handling systems (IHS) 202, 204. The IHS 202 can include a computing manager module 206 (or service processor 206) and a database 208. The IHS 204 can include an inventory computing module 210. The environment 200 can further include a plurality of devices 212. The IHS 202 can be in communication with the IHS 204, and in particular, the computing manager module 206 can be in communication with the inventory computing module 210. In some examples, the IHS 202 can include the inventory computing module 210. In some examples, the devices 212 can be internal to the IHS 202. In some examples, the IHS 202, 204 can include, or be similar to the information handling system 100 of FIG. 1.

In short, the environment 200 can facilitate defining interfaces that are required when the inventory computing module 210 (inband or remote) communicates with the computing manager module 206 and provides information thru API interfaces. The environment 200 can facilitate performing an internal method to the IHS 202 to create an internal data object representation for an unknown device using constructs (e.g., CMPI constructs), described further herein.

In some implementations, the inventory computing module 210 can perform an inventory of the devices 212 to identify a particular device 212. In some examples, the inventory computing module 210 can perform an inventory of all of the devices 212, and identify data properties of the devices 212. The inventory computing module 210 can further obtain metadata and the metaobject of the devices 212 (and associated drivers). For example, the devices 212 can be any type of devices that can be utilized with the IHS 202—such as peripheral component interconnect express devices (PCIe), a storage controller, a network controller, etc. The inventory computing module 210 can encapsulate such data of the devices 212. Specifically, the inventory computing module 210 can encapsulate data of the particular device 212 to create an inventory object with device identification and attributes as a name-value pair. The device identifier can be a PCIe device class identifier that can be mapped to an existing device fully qualified device descriptor (FQDD). The inventory computing module 210 can create instance objects for each device 212 that is inventoried.

The inventory computing module 210 can create a data structure for the particular device 212 including data identifying the particular device. In some examples, the inventory computing module 210 can employ a common manageability programming interface (CMPI) data structure; however, other implementations are possible. Specifically, a CMPI structure can be a standardized way of communicating between the IHS 202, 204, with the IHS 204 being able to process a CMPI data format, including creating internal data structures that are provided to interfaces. The CMPI format can include such granularity that can define a configuration method, data size, values, data type, metadata data, etc., that is provided between the inventory computing module 210 and the computing manager module 206, described further herein.

In some examples, CMPI is a standard API and data format for communication between management instrumentation and management endpoint. CMPI can include encapsulated data with introspection, and data encapsulation for data enumeration and actions/methods. In some examples, any CMPI data type that has management provider implementation-dependent details or contains CMPI data areas is an encapsulated data type. An encapsulated data type instance can include two parts—a pointer to its management provider dependent implementations and a pointer to a function table giving access to all operations supported by this type. Additionally, that are at least two components that define data items—the value itself and its type. As CMPI supports null values (a property has no value set), a third component can be used to define a state of the value indicating whether or not a value has been set. Values are represented as a union of all types supported by CMPI ("CMPIValue"); represented as a typedef ("CMPIType"); and value states represented as typedef ("CMPIValueState").

In some implementations, the inventory computing module 210 can provide to the computing manager module 206 a request that includes the data structure for the particular device 212. In some examples, the inventory computing module 210 can provide the instance of the particular device 212 (e.g., the inventory object) to the computing manager module 206 with the corresponding CMPI data structure (CMPI format) to the computing manager module 206. For example, the inventor computing module 210 can send a "CMPIData" format to the computing manager module 206 to attempt to create an instance of an existing entity (e.g., "CreateInstance( )), described further herein. The "CMPIData" can be a generic data blob that the computing manger module 206 can process and create managed object definitions internally.

In some implementations, the computing manager module 206 can parse the request and determining that a device class for the particular device 212 is a new device class. That is, the computing manager module 206 can parse the request in view of data that stored by the database 208, and based on such, determine that the device class for the particular device 212 is a new device class (e.g., data indicating such a device class is not currently stored by the database 208). In some examples, when the computing manager module 206 determines that the device class is a new device class, the computing manager module 206 can send an error message to the inventory computing module 210 ("throws back") indicating such an error—specifically, a message indicating that the device class is new, and more information is needed regarding the particular device 212 (e.g., existing entity is not available—no device found).

The inventory computing module 210 can create a device-specific class for the particular device 212 and a metaobject format for the particular device 212. Specifically, when the inventory computing module 210 receives the error message from the computing manager module 206—e.g., in response to determining that the device class for the particular device 212 is a new device class—the inventor computing module 210 can create the device-specific class for the particular device 212. In some examples, the inventory computing module 210 can create the device-specific class for the particular device 212 in an application specific namespace (e.g., ClassMIFT::CreateClass(namespace=<app-specific>, classname). In some examples, the device-specific class can include class definitions such as i) a list of device properties, ii) metadata for properties (e.g., writable, type, etc.); iii) a listing of supported intrinsic methods (e.g., CMPI methods); and iv) a listing of extrinsic methods and parameters.

In some implementations, the inventory computing module 210 can provide to the computing manager module 206 the created device-specific class and the metaobject format for the particular device. The computing manager module 206 can, in response to receiving such, create an instance of the device-specific class for the particular device 212. For example, the computing manager module 206 can create an instance of the particular device 212 in the database 208 (e.g., InstanceMIFT::CreateInstance( )). Further, property values of the instance can be set (e.g., InstanceMIFT::SetProperty( )).

In some examples, the computing manager module 206 can parse the request and determine that the device class for the particular device is stored by the database 208. The computing manager 206, in response to such a determination, can create an instance of the device class for the particular device 212. For example, the computing manager module 206 can map the device class (or data representing the device class) to data of existing device identifiers. The created data object can be stored as a HII object format that can be internally processed to create the object definition.

In some examples, the computing manager module 206 can configure the particular device 212, including invoking a method that is supported at the particular device 212. Specifically, the computing manager module 206 can attempt to invoke a CMPI method (either intrinsic or extrinsic) on a given CMPI entity (e.g., InvokeMethod( )). If the existing entity is not available, an error message is provided (e.g., no device found). If the method is not available (for extrinsic methods) or not supported (for intrinsic methods), an error message is provided (e.g., no such method). The method can be invoked in the appropriate namespace (e.g., ClassMIFT::InvokeMethod(namespace=<app-specific>, <instance-object-path>). The computing manger module 206 can forward to an appropriate external CMPI manager based on the namespace, and upon success, a method invocation result is retuned as a CMPI entity (otherwise, an error is provided).

In some examples, the computing manager module 206 can identify a change event of a database field (of the database 208) for a database object of the device-specific class, and create an associated indication instance. Specifically, the database objects can generate CMPI indication event data on any change of the database fields. For every created class instance, an associated CMPI indication instance can be created (as configured) which will receive the database change notifications, package it in a CMPI indication wrapper, and transmit the same to an event listener. In some examples, the computing manager module 206 can also continuously monitor variable data and update the created CMPI instance (e.g., CMPIModifyInstance). This can provide a continuous stream of updated data which can be used by the computing manager module 206 to create health-related information regarding the particular device 212.

FIG. 3 illustrates a flowchart depicting selected elements of an embodiment of a component and object management method 300. The method 300 may be performed by the information handling system 100, the computing environment 200, the computing manager module 206, and/or the inventory computing module 210, described herein with reference to FIGS. 1-2, or another information handling system. It is noted that certain operations described in method 300 may be optional or may be rearranged in different embodiments.

The inventory computing module 210 can perform an inventory of the devices 212 to identify a particular device 212 (302). The inventory computing module 210 can create a data structure for the particular device 212 including data identifying the particular device (304). The inventory computing module 210 can provide to the computing manager module 206 a request that includes the data structure for the particular device 212 (306). The computing manager module 206 can parse the request and determining that a device class for the particular device 212 is a new device class (308). The inventory computing module 210 can create a device-specific class for the particular device 212 and a metaobject format for the particular device 212 (310). Specifically, in response to determining that the device class for the particular device 212 is a new device class, the inventor computing module 210 can create the device-specific class for the particular device 212. The inventor computing module 210 can provide to the computing manager module 206 the created device-specific class and the metaobject format for the particular device (312). The computing manager module 206 can, in response to receiving such, create an instance of the device-specific class for the particular device 212 (314). The computing manager module 206 can parse the request to determine that the device class for the particular device is stored by the database 208 (316). The computing manager 206 can create an instance of the device class for the particular device 212 (318).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    performing, by an inventory computing module, an inventory of devices to identify a particular device;
    creating, by the inventory computing module, a data structure for the particular device including data identifying the particular device;
    providing, by the inventory computing module and to a computing manager module, a request including the data structure for the particular device;
    parsing, by the computing manager module, the request and determining that a device class for the particular device is a new device class;
    in response to determining that the device class for the particular device is a new device class, creating, by the inventory computing module, a device-specific class for the particular device and a metaobject format for the particular device;
    providing, by the inventory computing module and to the computing manager module, the created device-specific class and the metaobject format for the particular device; and
    creating, by the computing manager module, an instance of the device-specific class for the particular device.

2. The computer-implemented method of claim 1, further comprising:
    parsing, by the computing manager module, the request and determining that the device class for the particular device is stored by a database; and
    creating, by the computing manager module, an instance of the device class for the particular device.

3. The computer-implemented method of claim 1, further comprising configuring the particular device, including invoking a method that is supported at the particular device.

4. The computer-implemented method of claim 1, further comprising identifying a change event of a database field for a database object of the device-specific class, and creating an associated indication instance.

5. The computer-implemented method of claim 1, wherein creating the device-specific class includes creating the device-specific class in an application specific namespace.

6. The computer-implemented method of claim 1, wherein class definitions of the device-specific class include i) a list of device properties, ii) metadata for properties, iii) list of supported intrinsic methods, and iv) list of extrinsic methods and parameters.

7. A system comprising a processor having access to memory media storing instructions executable by the processor to perform operations comprising:
    performing, by an inventory computing module, an inventory of devices to identify a particular device;
    creating, by the inventory computing module, a data structure for the particular device including data identifying the particular device;
    providing, by the inventory computing module and to a computing manager module, a request including the data structure for the particular device;
    parsing, by the computing manager module, the request and determining that a device class for the particular device is a new device class;
    in response to determining that the device class for the particular device is a new device class, creating, by the inventory computing module, a device-specific class for the particular device and a metaobject format for the particular device;
    providing, by the inventory computing module and to the computing manager module, the created device-specific class and the metaobject format for the particular device; and
    creating, by the computing manager module, an instance of the device-specific class for the particular device.

8. The system of claim 7, the operations further comprising:
    parsing, by the computing manager module, the request and determining that the device class for the particular device is stored by a database; and
    creating, by the computing manager module, an instance of the device class for the particular device.

9. The system of claim 7, the operations further comprising configuring the particular device, including invoking a method that is supported at the particular device.

10. The system of claim 7, the operations further comprising identifying a change event of a database field for a database object of the device-specific class, and creating an associated indication instance.

11. The system of claim 7, wherein creating the device-specific class includes creating the device-specific class in an application specific namespace.

12. The system of claim 7, wherein class definitions of the device-specific class include i) a list of device properties, ii) metadata for properties, iii) list of supported intrinsic methods, and iv) list of extrinsic methods and parameters.

13. A non-transitory computer-readable medium storing software comprising instructions executable by one or more computers which, upon such execution, cause the one or more computers to perform operations comprising:
   performing, by an inventory computing module, an inventory of devices to identify a particular device;
   creating, by the inventory computing module, a data structure for the particular device including data identifying the particular device;
   providing, by the inventory computing module and to a computing manager module, a request including the data structure for the particular device;
   parsing, by the computing manager module, the request and determining that a device class for the particular device is a new device class;
   in response to determining that the device class for the particular device is a new device class, creating, by the inventory computing module, a device-specific class for the particular device and a metaobject format for the particular device;
   providing, by the inventory computing module and to the computing manager module, the created device-specific class and the metaobject format for the particular device; and
   creating, by the computing manager module, an instance of the device-specific class for the particular device.

14. The computer-readable medium of claim 13, the operations further comprising:
   parsing, by the computing manager module, the request and determining that the device class for the particular device is stored by a database; and
   creating, by the computing manager module, an instance of the device class for the particular device.

15. The computer-readable medium of claim 13, the operations further comprising configuring the particular device, including invoking a method that is supported at the particular device.

16. The computer-readable medium of claim 13, the operations further comprising identifying a change event of a database field for a database object of the device-specific class, and creating an associated indication instance.

17. The computer-readable medium of claim 13, wherein creating the device-specific class includes creating the device-specific class in an application specific namespace.

* * * * *